(12) United States Patent
Solie

(10) Patent No.: US 7,100,451 B2
(45) Date of Patent: Sep. 5, 2006

(54) SURFACE ACOUSTIC WAVE SENSING SYSTEM AND METHOD FOR MEASURING PRESSURE AND TEMPERATURE

(75) Inventor: Leland P. Solie, Apopka, FL (US)

(73) Assignee: Sawtek, INc., Orlando, FL (US)

( * ) Notice: Subject to any disclaimer, the term of this patent is extended or adjusted under 35 U.S.C. 154(b) by 70 days.

(21) Appl. No.: 10/926,851

(22) Filed: Aug. 26, 2004

(65) Prior Publication Data

US 2005/0056098 A1   Mar. 17, 2005

Related U.S. Application Data

(60) Provisional application No. 60/513,712, filed on Oct. 23, 2003, provisional application No. 60/498,993, filed on Aug. 29, 2003.

(51) Int. Cl.
*G01L 11/00* (2006.01)
(52) U.S. Cl. .......................................... 73/703
(58) Field of Classification Search .................. 73/703, 73/702
See application file for complete search history.

(56) References Cited

U.S. PATENT DOCUMENTS 3,978,731 A * 9/1976 Reeder et al. ................ 73/703
4,382,386 A   5/1983 Coussot et al.
4,994,798 A   2/1991 McColl
6,003,378 A   12/1999 Scherr et al.
6,137,708 A   10/2000 Lin et al.
6,571,638 B1  6/2003 Hines et al.

* cited by examiner

*Primary Examiner*—Edward Lefkowitz
*Assistant Examiner*—Andre Allen
(74) *Attorney, Agent, or Firm*—Allen, Dyer, Doppelt, Milbrath & Gilchrist, P.A.

(57) ABSTRACT

A surface acoustic wave (SAW) sensor and an interrogator that transmits a noise source to the sensor for receiving an interrogation signal that is processed and compared to the source signal provides pressure and temperature measurements. One SAW sensor a single interdigital transducer serving as both an input and an output transducer for generating and detecting a SAW, and coded reflectors in a mirrored arrangement opposing the single interdigital transducer. The piezoelectric substrate is supported in a hermetically sealed package such that pressure on the package causes distortion of the substrate transducer surface and thus SAW velocity changes that reflect changes in pressure. Characteristic temperature coefficients of delay for the substrate are directly translated into a temperature value.

18 Claims, 8 Drawing Sheets

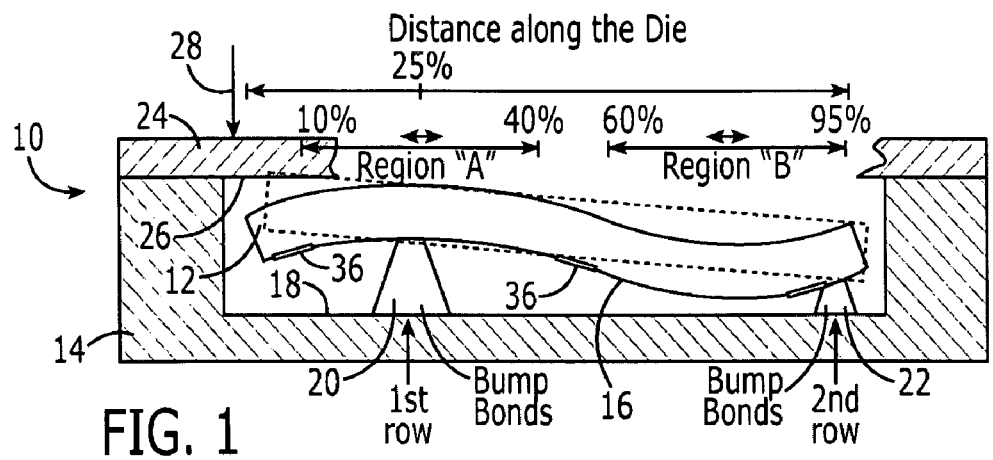
FIG. 1
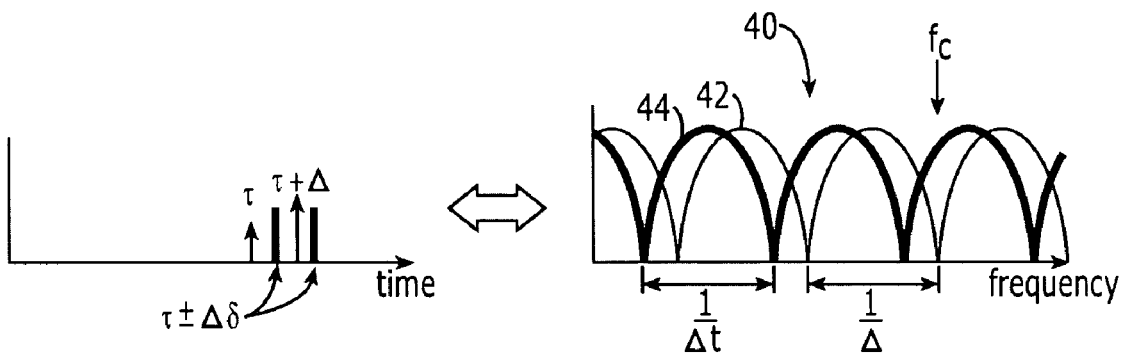
FIG. 2a
FIG. 2b
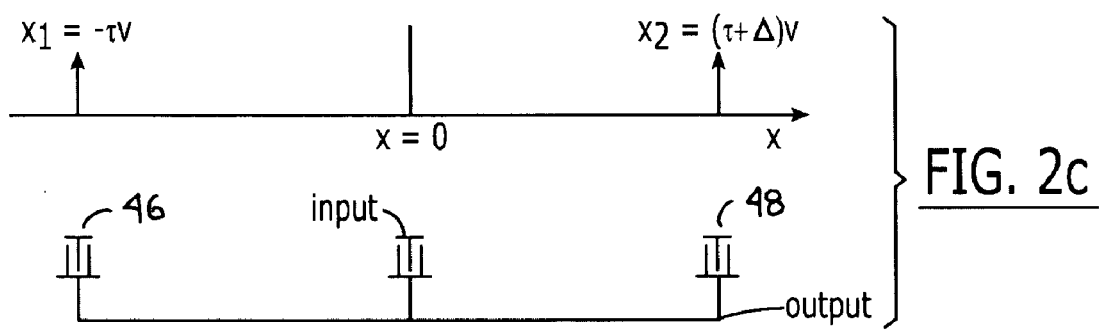
FIG. 2c
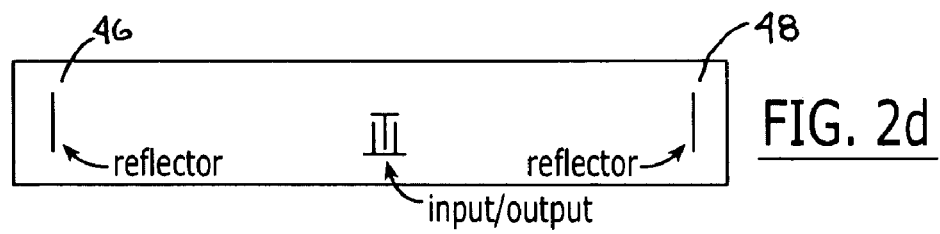
FIG. 2d

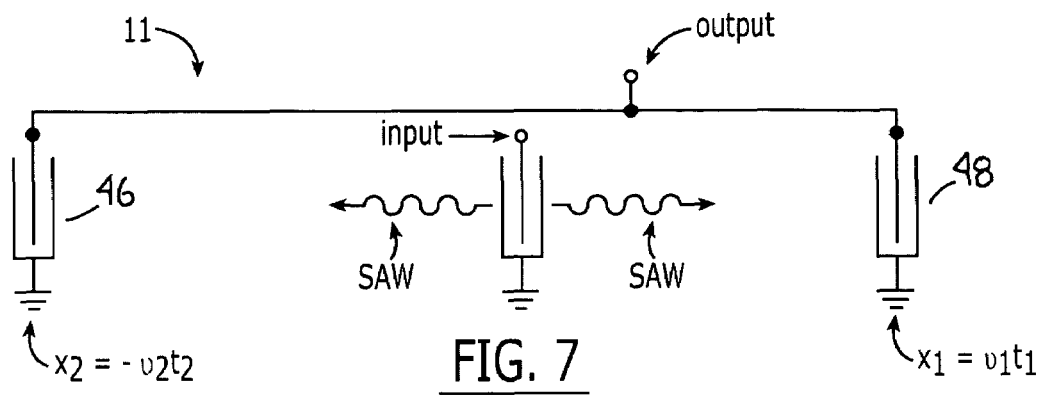
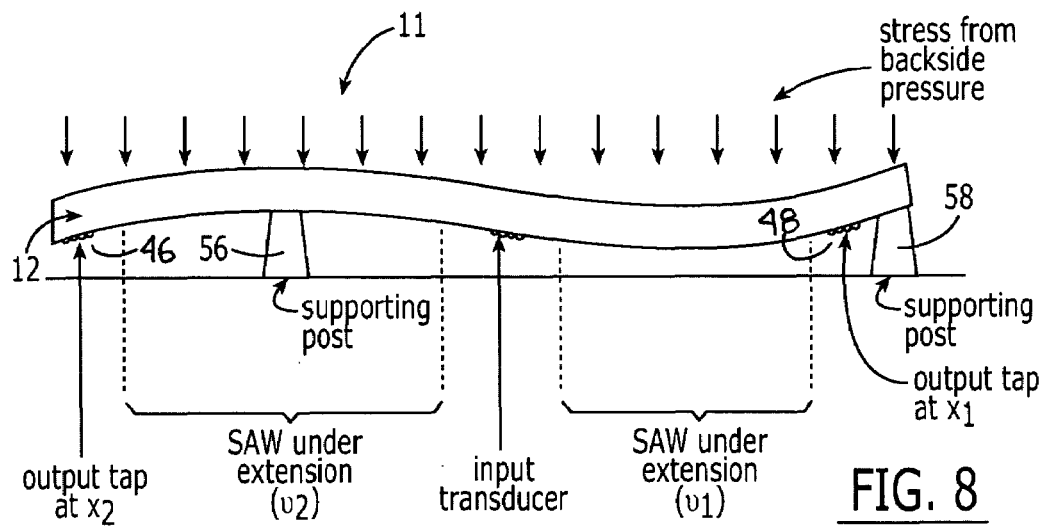
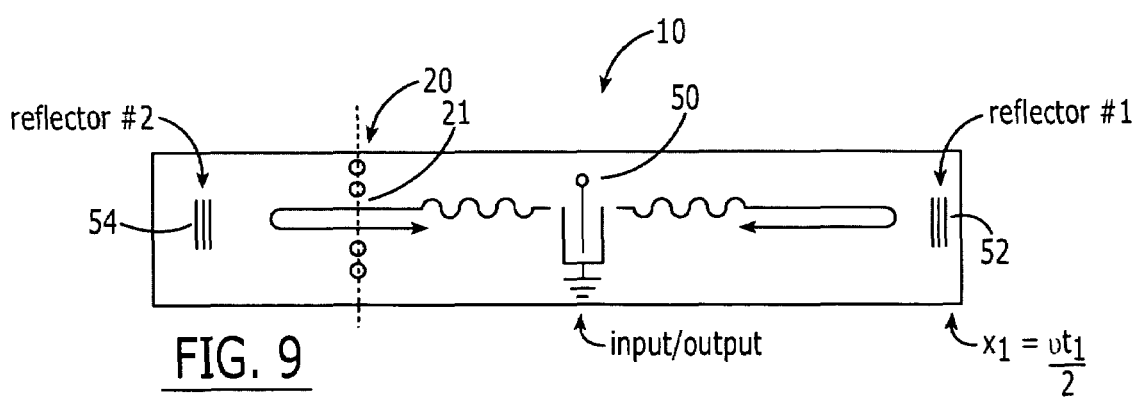

SURFACE ACOUSTIC WAVE SENSING SYSTEM AND METHOD FOR MEASURING PRESSURE AND TEMPERATURE

CROSS-REFERENCE TO RELATED APPLICATIONS

This application claims the benefit of U.S. Provisional Application Nos. 60/498,993, filed Aug. 29, 2003 for SAW Sensor for Measuring Pressure and Temperature, and 60/513,712 filed Oct. 23, 2003 for Pressure and Temperature Sensing System and Method, the disclosures of which are hereby incorporated by reference in their entirety, all being commonly owned.

FIELD OF THE INVENTION

The present invention relates temperature and pressure sensors, and more particularly to a temperature and pressure sensor operating with surface acoustic wave elements.

BACKGROUND OF THE INVENTION

Pressure and temperature sensors using surface acoustic wave (SAW) devices are known in the art. It is well known that the velocity of a SAW is sensitive to temperature and stress or strain on its SAW substrate. It is also well known that external forces on the SAW substrate can generate strain fields at the surface which will perturb the SAW velocity. By way of example, this effect has been used to make SAW pressure sensors where the change in SAW velocity changes the frequency of resonators or where the change in SAW velocity changes the time delay of a reflected signal. SAW sensors offer advantages such as passive device operation (no battery), wireless operation, small size, low cost, rugged construction, and ease of production in high volume using standard process equipment, as described by way of example in U.S. Pat. No. 6,571,638, the disclosure of which is herein incorporated by reference. Physical parameters measured using SAW sensors include temperature, pressure, strain, acceleration, and torque.

U.S. Pat. No. 6,003,378 to Scherr et al. discloses a pressure sensor using a SAW delay line formed on a pressure sensing membrane with the delay line extending over an expanding and compressing regions of the membrane. Scherr '378 teaches a SAW pressure sensor having reflectors disposed on only one side of an interdigital transducer. A wirelessly interrogatable pressure sensor using SAW elements include a reflective delay line with reflectors positioned on a pressure sensing membrane extending over both an expanding and a compressing region of the membrane. When subjected to a change in pressure, the reflectors located in regions of compression and expansion undergo shifts in acoustic wave velocity and hence in the phase angle of the reflected signal. The shifts in phase angle provide information on the pressure change that has occurred. Plate bending is used in this device, requiring a much larger device than would otherwise be needed in order to achieve the desired complementary stress distributions within the substrate.

U.S. Pat. No. 6,571,638 to Hines et al. discloses a pressure and temperature sensor that comprises a hermetically sealed insulating package and an elastic, piezoelectric substrate deformably supported within the package and perpendicular to a long axis of the SAW substrate. Three SAW resonators are fixed to a bottom of the substrate, two of which are positioned in a partially staggered, parallel relationship along the substrate for experiencing a different frequency shift responsive to a deformation of the substrate. A third resonator has a long axis nonparallel to the long axes of the two parallel resonators. The temperature coefficients the two parallel resonators are substantially equivalent with that of the third being different. This difference permits a temperature change to be sensed and transmitted. An electromagnetic signal is sent to the sensor from a remote location, which signal has a frequency resonant with the three resonators. An input electromagnetic signal is received at the remote location from the sensor. The input signal is indicative of the pressure and the temperature within the environment.

SUMMARY OF THE INVENTION

A pressure measurement system comprises a surface acoustic wave (SAW) sensor and an interrogator operable therewith. The sensor may comprise a substantially hermetic sealed package having a cover enclosing a cavity therein, a piezoelectric substrate carried within the cavity, wherein a first surface of the substrate for carrying a SAW transducer pattern thereon and a second opposing surface of the substrate carried in the cavity for a deforming thereof in response to pressure on the cover, a SAW transducer pattern carried on the first surface of the substrate, the SAW transducer pattern including an interdigital transducer serving as both an input and an output transducer for generating and detecting a SAW, and reflectors disposed on the opposing sides of the interdigital transducer, and at least two rows of bumps supporting the substrate within the cavity wherein a SAW velocity change about the region of the bumps is dependent upon the sensor temperature and pressure applied.

A pressure sensing system may comprise a SAW sensor having a SAW interdigital transducer and reflectors disposed upon a piezoelectric substrate, wherein the interdigital transducer serves as both an input transducer and output transducer, and an interrogator capable of transmitting an interrogating signal to the SAW sensor and receiving a sensor signal response. The interrogator, a processor and transceiver styled device, may include at least two delay lines for providing fixed delay reference signals, at least two multipliers for multiplying the sensor signal response with the reference signals and at least two integrators for integrating an output product of the at least two multipliers for providing signals that are indicative of at least one of pressure and temperature at the sensor.

One SAW sensor may comprise a substantially hermetically sealed package having a cover enclosing a cavity therein, a piezoelectric substrate carried within the cavity, wherein a first surface of the substrate for carrying a SAW transducer pattern thereon and a second opposing surface of the substrate is in contact or in very close proximity with the cover for deforming in response to pressure placed thereon, and a SAW transducer pattern carried on the first surface of the substrate, the SAW transducer pattern including an interdigital transducer serving as both an input and an output transducer for generating and detecting a SAW, and reflectors in an arrangement opposing the interdigital transducer. At least two rows of bumps supporting the substrate within the cavity, wherein a first row of bump bonds located a distance of approximately 25% in from one end of the substrate and a second bump bond located approximately 95% of the way along a length the substrate and the second row of bump bonds located at a distance approximately 95% therefrom such that when pressure is applied to the second side of the substrate through the cover acting as a membrane, a region around the first row of bump bonds corresponding to about 10% to 40% of the distance along the length of the substrate will experience a compressional strain resulting in an increase in SAW velocity approximately linearly with the pressure, and in a second region corresponding to about 60% to 90% of the distance along the length of the substrate is stretched for resulting in a decreasing of the SAW velocity approximately linearly with the pressure placed on the substrate, and wherein and wherein the substrate has a characteristic temperature coefficient of delay such absolute changes in delay are directly translated into a temperature value.

The interrogator communicating with the SAW sensor may comprise a voltage source for providing a source signal, an antenna operable with the sensor for transmitting a source signal to the sensor and receiving an interrogation signal therefrom, first and second frequency filters operable with the voltage source for receiving the source signal therefrom and providing first and second reference signals, first and second multipliers receiving the interrogation signal and the first and second reference signals, respectively, for providing first and second product signals therefrom, and first and second integrators for receiving the first and second product signals respectively and providing signals indicative of pressure at the sensor. The interrogator may further comprise third and fourth multipliers receiving a delayed interrogation signal and the first and second reference signals, respectively, for providing third and fourth product signals therefrom, third and fourth integrators for receiving the third and fourth product signals respectively and providing signals indicative of temperature at the sensor.

BRIEF DESCRIPTION OF THE DRAWINGS

Embodiment of the invention are described, by way of example, with reference to the accompanying drawings in which:

FIG. 1 is a partial side cross-sectional view of a sensor illustrating, by way of exaggeration, a change in a substrate resulting from a pressure change;

FIGS. 2*a* and 2*b* are plots of a time response and a corresponding frequency response, respectively, illustrating a SAW performance;

FIG. 2*c* is a diagrammatical view of a SAW transducer having separated taps and a time separation illustrated therefor;

FIG. 2*d* is a diagrammatical illustration of a bidirectional SAW transducer having a single tap;

FIG. 7 is a diagrammatical view of an alternate embodiment of the SAW transducer pattern of FIG. 6;

FIG. 8 is a partial side cross-sectional view of a sensor illustrating, by way of exaggeration, a change in a substrate resulting from a pressure change;

FIG. 9 is a diagrammatical view of a transducer surface side of the embodiment of FIG. 8;

DETAILED DESCRIPTION OF THE PREFERRED EMBODIMENTS

Figure 3A:
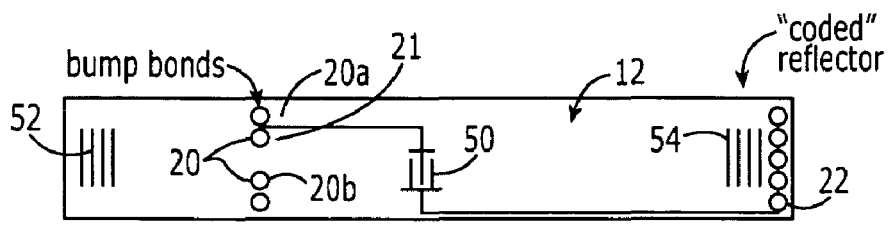
FIGS. 3*a* and 3*b* are partial diagrammatical top and side views of a SAW sensor in keeping with the teachings of the present invention for measuring temperature and pressure.

The present invention will now be described more fully hereinafter with reference to the accompanying drawings, in which preferred embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Referring initially to FIG. 1, one embodiment of the present invention provides a SAW sensor 10 as a filter device that has a reflected filter response affected by a change in SAW velocity. By way of example, a filter response may change with pressure when a SAW substrate or die 12 is mounted in a ceramic package 14 and attached with a transducer pattern surface 16 facing toward an inside bottom 18 of the package by at least two rows of gold bump bonds 20, 22. The two rows of bump bonds 20, 22 provide the mechanical support to hold the die as well as two electrical contacts to the die. A relatively thin metal cover 24 hermetically seals the SAW substrate 12 within the package 14. This cover 24 or lid is placed in direct contact or optionally in very close proximity with the backside 26 of the die 12 and acts as a membrane to transfer pressure 28 as a distributed force onto the backside of the substrate. The first row of bump bonds 20 is located about 25% of the way along the length 30 of the die 12 and the second row 22 is located about 95% of the length as illustrated with continued reference to FIG. 1. Therefore, as pressure is applied to the backside 26 of the substrate 12 through the cover 24 acting as a membrane, the region around the first row of bump bonds 20, that corresponding to about 10% to 40% of the distance along the die 12, will experience a compressional strain 32, herein referred to as region "A". In region A, the SAW velocity will increase approximately linearly with a compressional strain (i.e. pressure). In a second region 34 defined as region "B" ranging from about 60% to 90% of the die length 30, the front face 16 of the die 12 (the transducer patterned side connected to the bump bonds) is stretched and results in SAW velocity decreasing approximately linearly with the backside pressure 28. While such describes the mounting of the die 12 within the package 14 including external pressure perturbing the velocities in region "A" and "B" of the die, it does not yet address the transducer pattern 36 on the face pattern surface 16 of the die 12 where the SAW is launched and detected and in fact, where the SAW filter response is determined.

By way of example, consider a filter having a time response including two time samples 38 at times $\tau$ and $\tau+\Delta$ as illustrated with reference to FIG. 2a. The corresponding frequency response 40 for such a filter is illustrated with reference to FIG. 2b. The response 40 includes a set of periodic lobes 42 with nulls 44 separated in by way of example with reference to FIG. 2c, a delay of time with two taps 46, 48 is constructed with one tap 46 located $x_1=\tau v$ away from the source (where $v$ is the SAW velocity) and the second tap 48 at $x_2=(\tau+\Delta)v$ from the source. A tap may be a broadband interdigital transducer or a reflector. Then the two taps are separated by only $\Delta x=(x_2-x_1)=v\Delta$. If $\Delta$ is in the order of a few nanoseconds, $\Delta x$ is in the order of a few microns. It is clearly difficult, if not possible, to change the time delay and thus change the filter response over such a short propagation distance. But if a source is bi-directional and symmetric, one tap can be located at $x_1=-\tau v$ and the second at $x_2=+(\tau+\Delta)v$. The filter response of the two taps is the same as shown in FIG. 2b, but now nearly the entire path length from x=0 to $x_1=\tau/v$ can be placed in region "A" where the velocity is increasing, and nearly the entire path length from x=0 to $x_2=+(\tau+\Delta)v$ can be placed in region "B" where the velocity is decreasing, as illustrated with reference to FIGS. 2c and 2d. In this circumstance, the relative positions of the $\tau$ and $\tau+\Delta$ can change significantly as pressure is applied to the backside of the die. With $\delta$ equaling the change in time delay between first and second taps 46, 48 due to pressure on the die, the time separation between taps is $\Delta+\delta$ and the frequency change between nulls is $1/(\Delta+\delta)$. Since $\Delta$ and $\delta$ can be designed to have the same or opposite sign, the frequency null can even approach infinity so the shift in null frequency with changes in pressure can be tremendously large, orders of magnitude more sensitive than a shift in resonant frequency or time delay as is used in other SAW sensor approaches. Such is design dependant and can be set to any convenient range, an advantage for embodiments of the invention over typical passive SAW devices.

By way of example, a passive SAW sensor may be a one port device connected to an antenna. In the discussion thus far it is implicitly assumed that the input transducer is connected in parallel with the two output taps. A preferable technique is to use one SAW transducer at the input location and replace the output taps by SAW reflecting elements. This would be a single metal electrode or group of electrodes. The reflecting elements would cause a portion of the SAW signal to return to the input, and thus the input transducer serves as both input and output transducer for the delayed reflection. This "folding" of the acoustic path back to the input doubles the sensitivity by effectively doubling $\delta$ for a given substrate length and it facilitates the electrical matching of the transducer to the antenna since only one transducer is connected to the port.

Figure 3B:
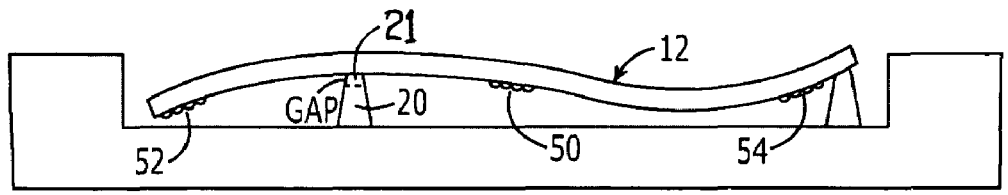

One example of such layout on the die 12 is shown schematically in FIG. 3a and the side view of the die in FIG. 3b. For the embodiment herein described by way of example, the first row of bumps 20 has a gap 21 through which the SAW can propagate. That row of bumps 20 may provide one 20a or both 20a, 20b of the electrical contacts for a transducer 50. Reflectors 52 may include a few strips that serve as wide band reflectors in which case the frequency response is determined by $\tau$ and $\Delta$. It is also possible to "code" the reflectors 52, 54 by arranging the positions of the reflecting elements to generate a specific code. In this way, each sensor 10 has a unique reflected signal that can be identified as an ID tag. By way of example, pressure from each tire of a vehicle may be identified and responses for acceptable adjacent vehicle tires can be ignored. The coded reflectors 52, 54 are mirror images of one another.

While details thus far have addressed frequency response changes with pressure, temperature is also of interest. The SAW velocity for all but a few selected substrates varies with temperature. For embodiments herein described, it is useful to choose a substrate with an appreciable temperature coefficient of delay (TDC). For example YZ LiNbO$_3$ has TCE of 93 ppm per degree centigrade. For a typical operating temperature range of 120° C. the velocity and hence delay will vary by 1.12%. Changes in delay of this magnitude are easily measurable so absolute changes in delay may be directly translated into temperature. The frequency response, which as above described is an indicator of pressure, will also change by this same 1.12%, but the change in the frequency response due to pressure is design dependent and can change over a range of several hundred megahertz. The temperature measurement depends upon the delay parameter $\tau$ and pressure depends upon $\delta$. Consequently both pressure and temperature can be sensed with the simple SAW device shown schematically in FIG. 3a with only a single acoustic track.

Figure 4:
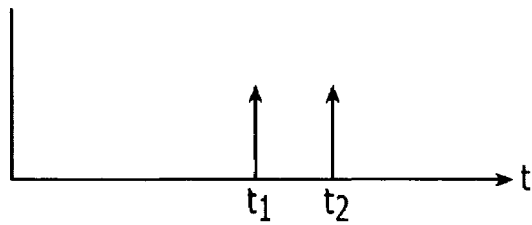
FIGS. 4 and 5 are time and frequency plots, respectively, illustrating responses for a transversal filter having two taps.

Consider the sensor 10 as a transversal filter. For a transversal filter with taps at $t_1$ and $t_2$, the time domain representation is illustrated with reference to FIG. 4.

Figure 5:
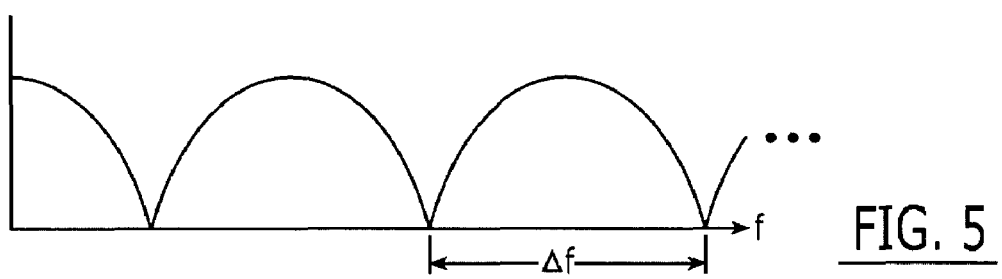

Define $$\Delta f \equiv \frac{1}{t_2 - t_1}$$

then the FFT (Frequency domain representation may be illustrated as presented in FIG. 5.

Figure 6:
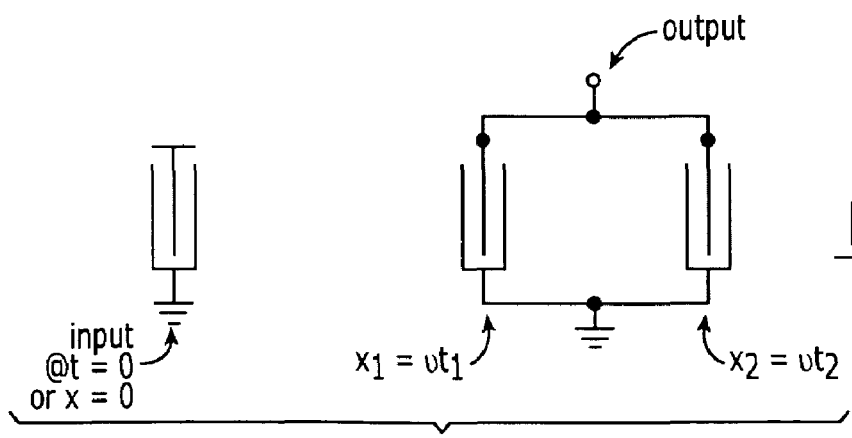
FIG. 6 is a diagrammatical view illustrating an interdigital transducer pattern for providing the responses of FIGS. 4 and 5.

Note that this response expands or contracts (scales) in frequency with $t_1-t_2$ and as $t_1 \to t_2, \Delta f \to \infty$. So small changes in $t_1$ and $t_2$ result in large changes in $\Delta f$. The first lobe is always centered at f=0. We may implement this transversal filter by the following SAW filter as illustrated with reference to FIG. 6.

So $t_2-t=x_2/v-x_1/v$ or $$\Delta f = \frac{1}{t_2 - t_1} = \frac{1}{\frac{x_2}{v} - \frac{x}{v}}$$

In this case $v$ is common to the delays of both taps so $v$ can be considered a constant and so $$\Delta f = \frac{v}{x_2 - x_1}$$

So if $v$ changes by one part per thousand (1 ppk) $\Delta f$ will only change by 1 ppk due to changes in pressure or temperature.

Consider a SAW device, or sensor 11 as illustrated with reference to FIG. 7. This sensor 11 may have an identical response to that of the earlier described sensor 10, but now a propagation path to each of the two taps 46, 48 is different and so $v_1$ and $v_2$ can be perturbed differentially. By way of further example, consider the die 12 subjected to a stress resulting in an "S" curvature as illustrated with reference to FIG. 8. Supporting posts 56, 58 can be placed so as not to lie in the SAW path. Now consider that $v_1$ and $v_2$ as the average SAW velocities between the input transducer and $x_1$ and $x_2$, respectively. $x_1$ and $x_2$ are fixed with the design but $v_1$ and $v_2$ change with stress from the backside pressure. In particular $v_1$ decreases and $v_2$ increases as the pressure increased. As earlier described, a usable range of operation is a maximum shift of about 1000 ppm (1 ppk).

$$\frac{v_2 - v_1}{v_1} \approx 0.001$$

Since $$\Delta f = \frac{1}{\frac{x_2}{v_2} - \frac{x_1}{v_1}}$$

and, $v_2$ and $v_1$ respond differentially to pressure we can say $$v_1 = v_o - \delta_v/2 \quad v_2 = v_o + \delta_v/2$$

$$\Delta f = \frac{1}{\frac{x_2}{v_o + \frac{\delta_v}{2}} - \frac{x_1}{v_o - \frac{\delta_v}{2}}}$$

$$= \frac{v_o}{\frac{x_2}{1 + \frac{\delta v}{2v_o}} - \frac{x_1}{1 - \frac{\delta v}{2v_o}}}$$

$$\approx \frac{v_o}{x_2\left(1 - \frac{\delta v}{2v_o}\right) - X_1\left(1 + \frac{\delta v}{2v_o}\right)}$$

$$\Delta f \approx \frac{v_o}{X_2 - X_1 - \bar{t}\frac{\delta v}{v_o}}$$

where $\bar{t}$ is the mean value of $t_1$ and $t_2$ i.e.

$$\bar{t} = \frac{t_1 + t_2}{2} \text{ or } \Delta f = \frac{1}{t_2 - t_1 - \bar{t}\frac{\delta v}{v_o}} = \frac{\frac{1}{\bar{t}}}{\frac{\delta t}{\bar{t}} - \frac{\delta v}{v_o}};$$

where $\delta t = t_2 - t_1$

If $t_2$ and $t_1$ are sufficiently close, it is possible for the denominator to vanish and $\Delta f \to \infty$ (This is not desirable). It is clear that the sensitivity of $\Delta f$ with pressure can be as high as we want and becomes a design parameter. It could for example, change over a range of several hundred $MH_z$.

It is to be noted that $t_1$ and $t_2$ are on the order of 1 μS and $|t_2-t_1|$ is on the order of a few ns. The small difference between two large numbers must be controlled very pre-cisely and this is done on the same substrate where relative differences between t can be very precisely controlled.

With reference to FIG. 9, and by way of example, one embodiment of this invention may include a device having a single transducer 50 serving as both input and output and SAW reflectors 52, 54 placed at $x_1=vt_1/2$ and $x_2=vt_2/2$.

By way of further example and as illustrated with reference to FIG. 10, a system 60 for sensing pressure and temperature may include the passive SAW sensor 10 as above described as having a reflected response which varies with pressure and temperature and a remotely located processor, herein referred to as an interrogator 62 that measures parameters indicative of the pressure and temperature. The interrogator 62 herein described, by way of example, is understood to be compatible with the SAW sensor with regard to variations in sensor response to be measured. Since the sensor 10 may comprise a one-port SAW device connected to an antenna 64, a relevant response may include a reflected filter or $S_{11}$ response, which amplitude response indicates the pressure and which delay indicates the temperature, as earlier described. The amplitude response is a series of identical lobes separated by nulls as above described and as illustrated with reference to FIG. 11 where changes in pressure cause a separation between nulls 44 Δf to increase or decrease, as herein illustrated by way of example. Since mathematically the first lobe 43 is centered at zero frequency, the lobes 42 and nulls 44 shift up and down with pressure as illustrated with a dotted line plot of FIG. 11. It is the shift in frequency of the lobes 42 that is an indicator of pressure, and it is one of the tasks of the interrogator 62 to measure this shift in frequency.

Figure 12:
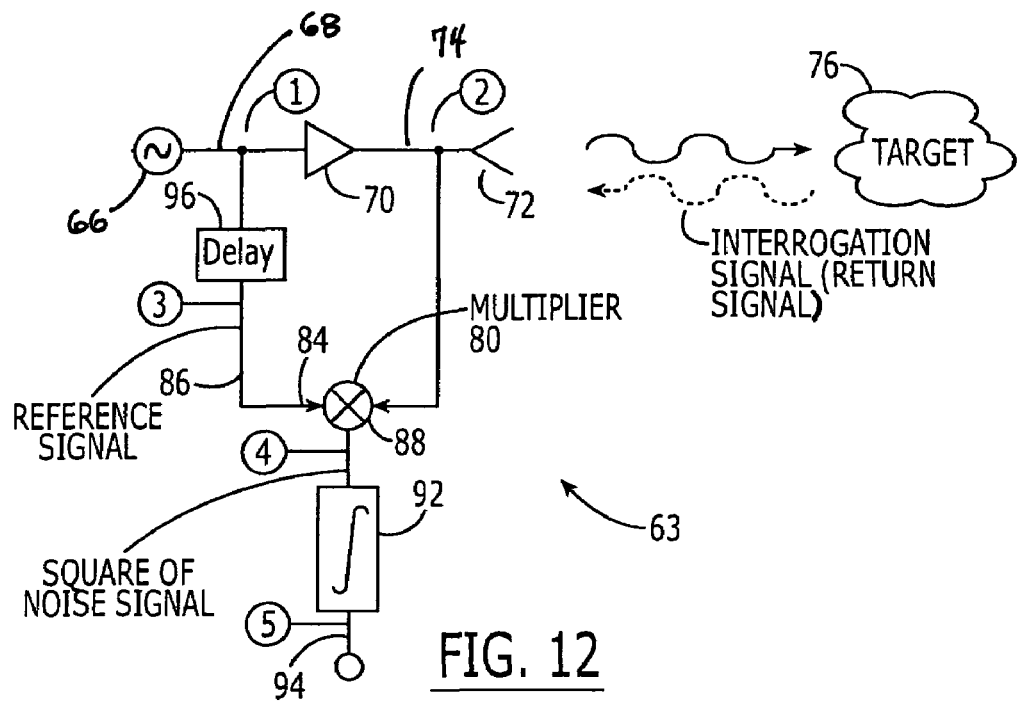
FIG. 12 is a schematic block diagram illustrating a detection system including a time integrating correlator.

One detection process using one embodiment of a time integrating correlator as the interrogator 63 is illustrated, by way of example, with reference to FIG. 12. A wide band noise source 66 may supply a voltage signal to a first node 68 (node "1" with nodes herein illustrated for locations within a circuit by encircled numbers). This signal at the first node 68 is amplified by amplifier 70 and applied to an antenna 72 at a second node 74 (node "2"). The amplified signal may then be transmitted and received by a target 76 and reflected back to the interrogator 62 where it appears as a voltage at the second node 74 (node "2"). The amplifier 70 blocks the returned signal from going back to the first node 68 (node "1"), but it is applied to one input port 78 of a multiplier 80. While passing from the first node 68 to the second node 74, propagating to the target 76, and returning to the second node 74, a signal time delay (T) is experienced. This delayed signal, which has been reflected by the target 76 and returned to the input port 78 (right side input) of the multiplier 80, is herein referred to as an interrogation signal.

With continued reference to FIG. 12, the same noise signal at the first node 68 which is the source of the interrogation signal at the input 78 is applied to a delay line 82 to provide a reference signal to be applied to a second input port 84 (the left side input) of the multiplier 80 at a third node 86 (node "3"). The reference signal and the interrogation signal have traveled different paths but both have experienced the same time delay. Therefore, except for different amplitude levels, the two signals are identical regardless of the nature of the noise source. A signal at an output 88 of the multiplier, herein referred to as a fourth node 90 (node "4") is therefore a product of identical signals or a square of the noise signal. The square of any voltage is a positive number, so the output of an integrator 92 at a fifth node 94 (node "5") is a constantly increasing value. The signal level of node "4" is a low level signal that has experienced significant attenuation, particularly in the path to the target and back. An integration of what may be a low level dc voltage offset results in significant levels of processing gain. As a typical example, if the noise bandwidth of the signal at the multiplier 80 is 200 MHz and the effective integration time of the integrator is 1.0 millisecond, the processing gain is 200,000 or 106 dB. This may be regarded as a direct amplification of the information/interrogation signal with respect to the noise signal. The output of this simple circuit for interrogator embodiment 63 does not directly provide information of the pressure or temperature, but it does provide an approach for interrogating a passive sensor with enormous processing gain useful in providing both pressure and temperature measurement from a sensor as will be herein described. The operation of a time integrating correlator capable of large processing gain is well known in the field of signal processing.

By way of further example and with continued reference to FIG. 12, the noise source 66 may be a white noise generator or may be a pseudo noise generator (i.e., PN code generator) or any other wide band signal generator. The delay line 82 may be a SAW delay line. The multiplier 80 may be a diode or diode array; and the integrator 92 may be a simple RC circuit. The time constant of the RC circuit provides the effective integration time.

Figure 13A:
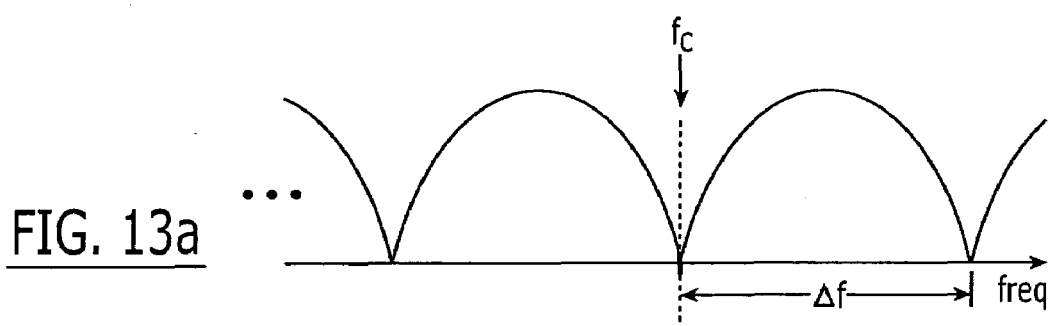
FIGS. 13*a*, 13*b*, and 13*c* are frequency plots illustrating signals at filter and multiplier outputs within the system embodiment of FIG. 10.
Figure 13B:
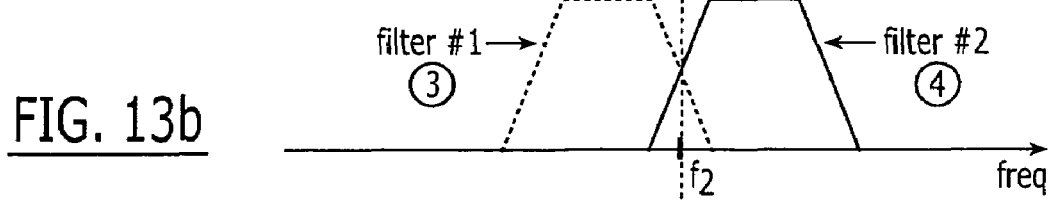
Figure 13C:
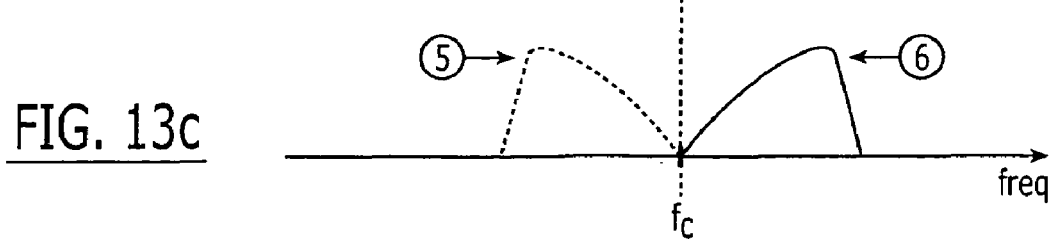

With reference now to FIGS. 13a, 13b, and 13c, signal processing is done in the frequency domain and is illustrated, by way of example, for the system 60 above described with reference to FIG. 10. In FIG. 13a, a frequency response of the sensor 10 with no applied pressure is illustrated. The location of one of the nulls is defined as $f_c$ and the spacing between nulls is $\Delta f$. FIG. 13b illustrates frequency responses of first and second filters 96, 98 for the embodiment illustrated in FIG. 10 as filter #1 and filter #2. Note that these responses illustrated with reference to FIG. 13b cross at center frequency, $f_c$. As earlier described with reference to the embodiment of FIG. 12, the noise source 66 is also applied for the embodiment illustrated with reference to FIG. 10, and as earlier described, the interrogation signal is generated by the noise source 66 as seen at the first node 68, amplified as seen at the second node 74, and transmitted to and reflected back from the sensor 10 at the second node 74. Before being transmitted to the sensor 10, the power density of the noise source 66 is flat. After being reflected back from the sensor 10 the power density at the second node 74 has a "lobed" response, as illustrated with reference to FIG. 13a. This returning interrogation signal is applied to the right input port 78, 78A of the two multipliers 80, 80A. For the embodiment herein described with reference to FIG. 10, the reference signal at first node 68 is filtered and delayed by first and second filters 96, 98 (filters #1 and #2) and is applied to the left, second input ports 84, 84A of the multipliers 80, 80A at nodes "3" and "4", respectively of the embodiment of FIG. 10. The spectral power densities at node "3" and "4" are shown in FIG. 13b as the dotted and solid lines, respectively. The delays through the SAW filters 96, 98 are identical and are equal to the delay through the interrogation path. In that case, at each frequency the interrogation signal at node "2" is identical in phase and delay to the reference signal at node "3" so the multiplier output 88A at node "5" is the square of the noise signal component (i.e., positive dc level) times the product of the spectral levels illustrated in FIGS. 13a and 13b as shown in FIG. 13c. So the base band signal level at node "5" as shown as the dotted line in FIG. 13c is the product of the signal of FIG. 13a plot times the dotted line from node "3" as shown in FIG. 13b, and similarly for the voltage at node "6" shown in FIG. 13c. The integrated outputs at nodes "7" and "8" are the integration of curves 5 and 6 of FIG. 13c, respectively.

The integration process integrates the curves over frequency and then integrates over time according to the time constant of the RC integration circuit. In this case, the integrators 92, 92A with output levels of "7" and "8" are equal because of the symmetry of the curves in FIG. 13c, and the ratio of the output levels is 1.0. This ratio is the parameter that indicates the pressure. A lookup table may be established or proportionality established for this ratio, henceforth called the output ratio and provides a pressure measurement.

Figure 14A:
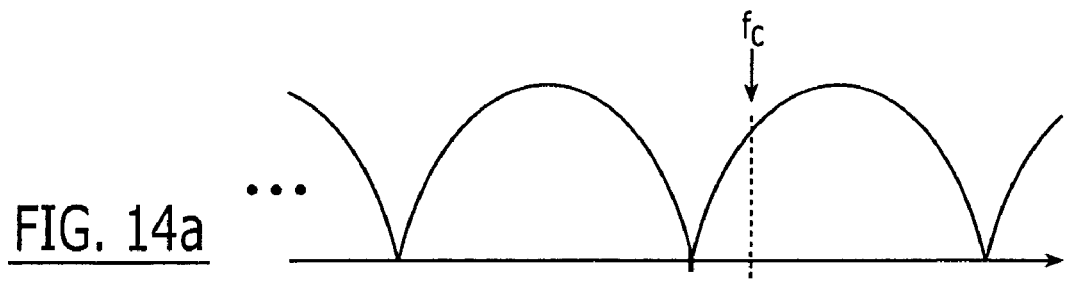
FIGS. 14*a*, 14*b*, and 14*c* are frequency plots illustrating signals at filter and multiplier outputs within the system embodiment of FIG. 10 responsive to a pressure change at the sensor.
Figure 14B:
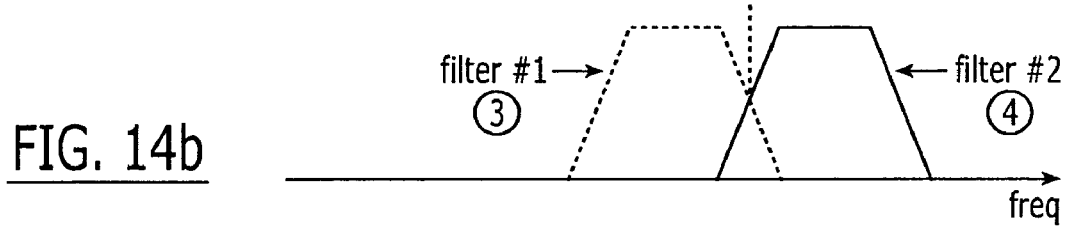
Figure 14C:
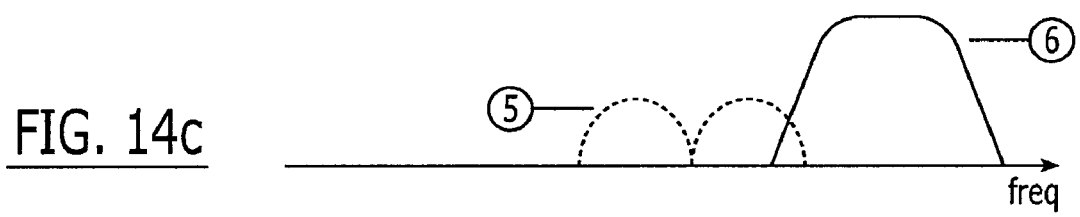

By way of further example, assume that the sensor 10 is exposed to a pressure that results in a sensor response shifted in frequency as shown in FIG. 14a. The reference signal through the filters 96, 98 (filters #1 and #2) are not shifted and cross at frequency $f_c$ as before. The outputs of the multipliers are illustrated in FIG. 14c. Note that the signal at node "5" includes two lobes, which lobes are of opposite sign so that when integrated, they are subtracted and can in fact cancel each other so the integrated output "7" is small while the integration the signal at node "6" shown in FIG. 14c is larger. The ratio of the voltages at nodes "8" and "7" is a large number which can be associated with a specific pressure. Note that the absolute value of the voltages at "7" and "8" will vary with integration time and with reflection loss from the sensor but the ratio between these voltages will not be affected by these variations and as a result will be an accurate indicator of pressure.

Figure 10:
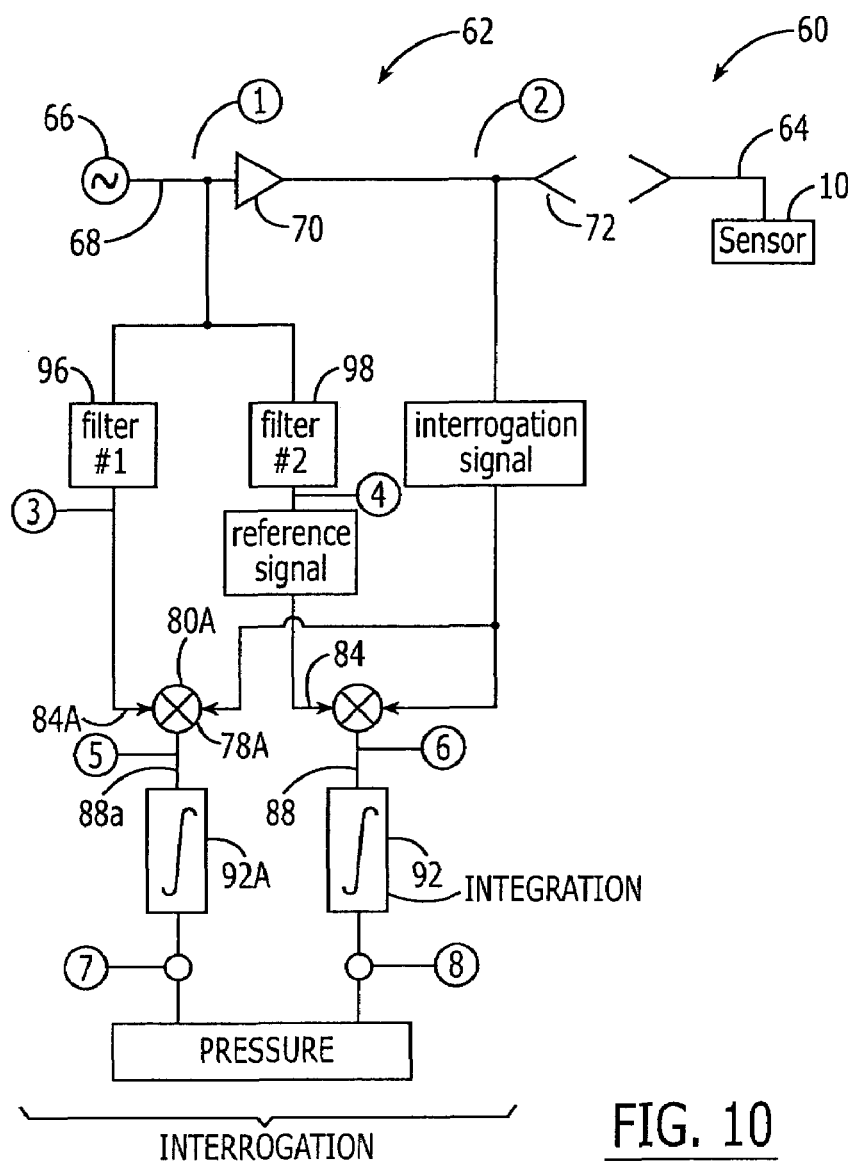
FIG. 10 is a schematic block diagram illustrating one embodiment of a pressure measurement system in keeping with the teachings of the present invention.
Figure 11:
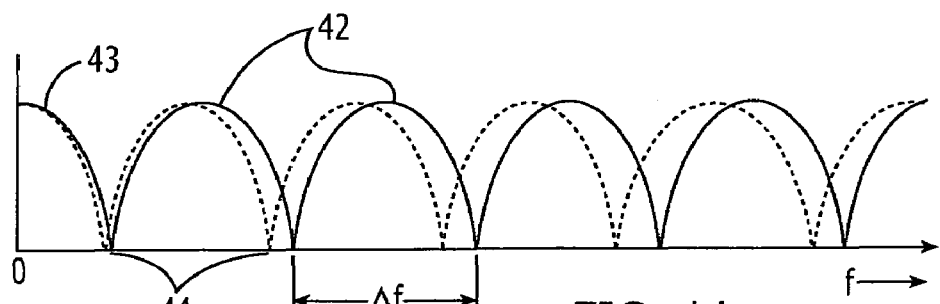
FIG. 11 is an amplitude versus frequency response illustrating changes in null positions responsive to pressure changes at the sensor.

The system 60 illustrated in FIG. 10, by way of example, may be used to remotely interrogate the sensor 10 and determine the pressure, but it has been assumed that the delay in the reference path is the exactly the same as the delay through the interrogation path. This can be maintained in stationary systems, but if the delay changes due to a change in path length between the two antennas 64, 72 or due to temperature dependent delays within the sensor or reference filters, then the signals at the two inputs to the multipliers 80, 80A will not be identical (except for an amplitude level which is acceptable, and the outputs at nodes "5" and "6" will not be at dc levels (or base band) and the whole process breaks down. In short, the process work most effectively when the delays between the two paths are equal. This is a very useful feature of the system because it means that the signal directly from the amplifier 70 (at node "2") that appears at the multipliers 80, 80A will not correlate because the delay does not match the delay through the filters 96, 98, and thus the product of these signals is a noise signal which changes sign randomly and thus will integrate to zero.

By way of further example, the system 61 illustrated with reference to FIG. 15 includes features earlier described with reference to FIG. 12, and further includes a coaxial delay line 100, two additional multipliers 80B, 80C, and additional integrators 92B, 92C. The coaxial delay line 100 adds a small amount (a few nanoseconds typically) of additional delay to the interrogation path of the added sections, herein referred to as Channel B 102 with the earlier described as Channel A 104. The delays in the interrogation path and reference path are such that in Channel A 104 the delay in the reference path is slightly more than the delay in the interrogation path whereas in channel B 102 with the extra delay from the coax delay line 100, the delay in the reference path is slightly less than the delay in the interrogation path. In the earlier description with reference to FIG. 12, it was assumed that the delay in the reference path and the interrogation path were equal but for systems that have sensors whose delay varies with temperature, it is difficult to maintain an exact delay in both paths. If the delays are different, the amplitude of the integrated responses falls off as a Gaussian function, where the width of the Gaussian is the inverse of the bandwidth of the noise signal (i.e., 1/BW). This is a useful feature because it provides a means of measuring the temperature of the sensor simultaneously with measuring the pressure.

By way of example, the substrate 12 of the sensor 10, as earlier described with reference to FIGS. 1, 3, 8, and 9, is chosen that has a significant temperature variation of delay. Assume for the moment that the temperature of the sensor is set to one extreme end of the temperature range so that the delays in the reference path and interrogation path were exactly equal in channel A. By way of example, this may be done by raising the temperature of the sensor substrates with a negative temperature coefficient of delay (TCD) that increases the delay in the interrogation path making the delays equal. In this case, the responses as measured at ports "5" and "6" in the system 61 of FIG. 15 are exactly the same as for ports "5" and "6" in the system 60 of FIG. 10, and the pressure is determined by the ratios of the integrated signals at nodes "7" and "8". The voltages at outputs of the integrators 92B, 92C, nodes "12" and "13" are much smaller but finite because they are off the peak of the Gaussian curve.

Figure 15:
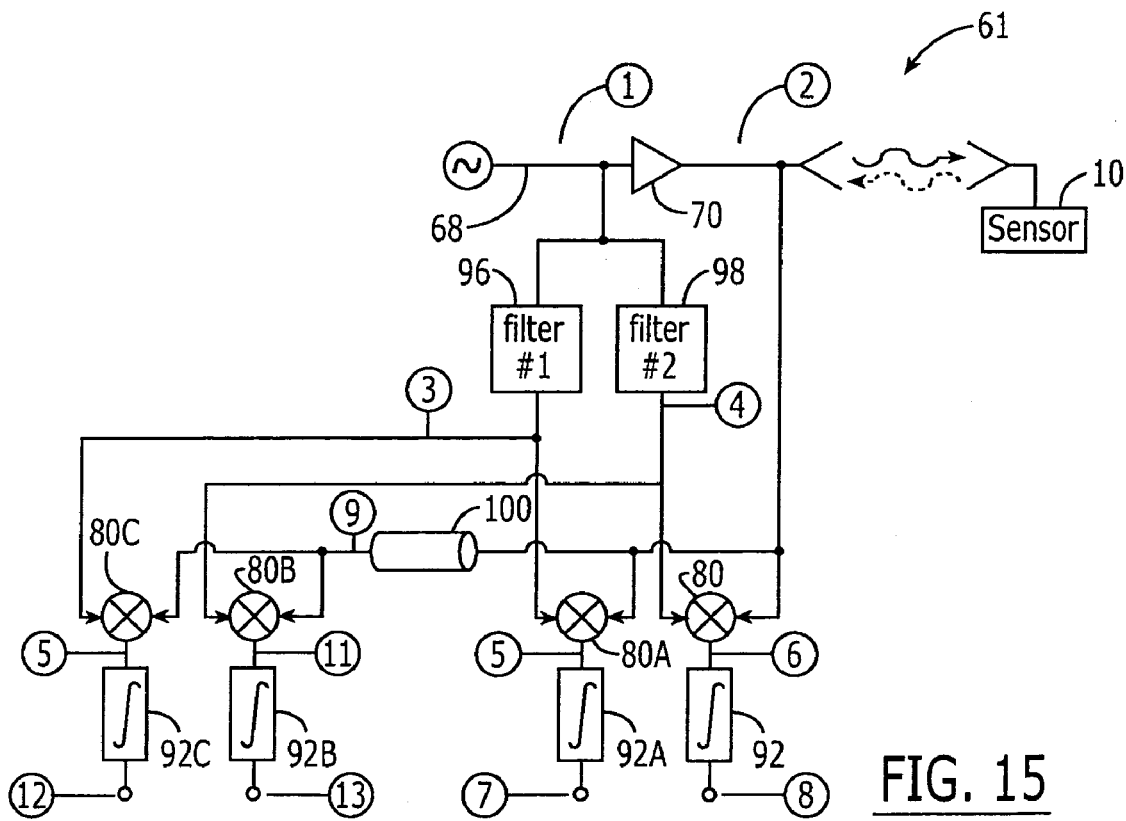
FIG. 15 is a schematic block diagram illustrating one embodiment of a pressure and temperature measurement system in keeping with the teachings of the present invention.

With continued reference to FIG. 15, consider the temperature of the sensor 10 to be decreased such that the delay in the interrogation path decreases by exactly the amount of delay in the coaxial delay line 100. As a result, the reference path and interrogation path delays in channel B 102 will be equal, and the pressure may be determined by taking the ratios of the voltages at the nodes "12" and "13" in channel B. The output levels at ports "7" and "8" will be much lower but can still be used to measure the pressure.

Figure 16A:
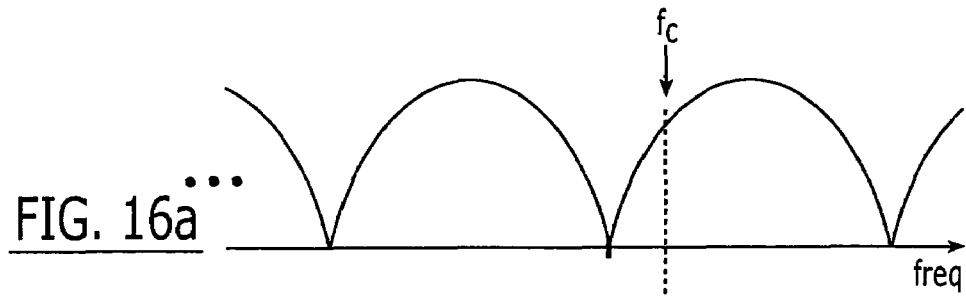
FIGS. 16*a*, 16*b*, 16*c*, and 16*d* are frequency plots illustrating interrogation and reference path signals as well as multiplier output signals for the sensor embodiment of FIG. 15.
Figure 16B:
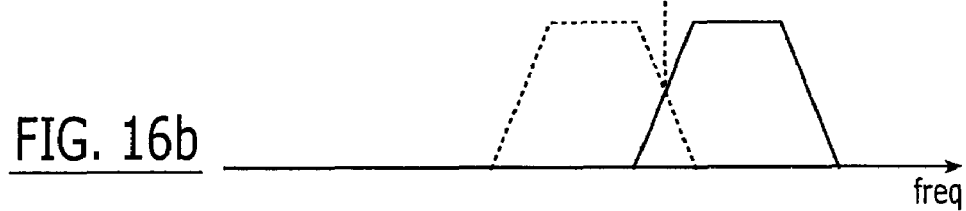
Figure 16C:
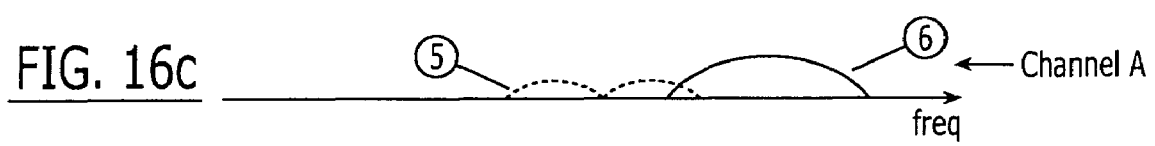
Figure 16D:
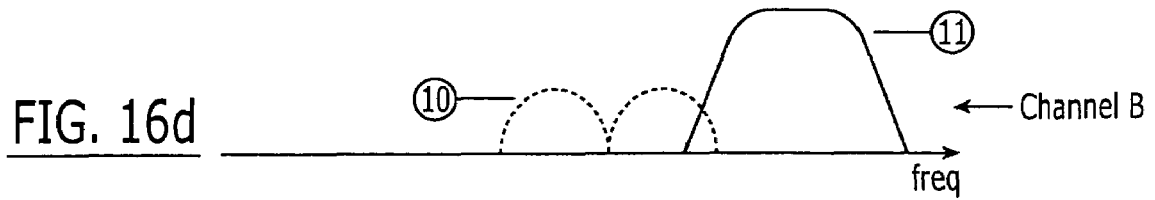

This suggests that the ratio of R=(|V7|+|V12|)/(|V8|+|V13|) can be used over the entire temperature range to measure pressure (V# herein referred to as a voltage at node #). The signal levels in channel A and channel B vary with temperature so the ratio R=(|V7|+|V8|)/(|V12|+|V13|) can be used to provide a direct measurement of the temperature of the sensor. By way of example, FIGS. 16a and 16b illustrate frequency spectra of the interrogation signal and reference path signal as earlier described with reference to FIGS. 14a and 14. FIG. 16c illustrates multiplier outputs of channel A at nodes "5" and "6", and FIG. 16d illustrates multiplier outputs of channel B at nodes "10" and "11". For the case shown in FIGS. 16c and 16d, the curves are the same except for amplitude levels. Channel B levels are higher than channel A levels indicating that the temperature is lower, i.e., the lower the temperature, the higher the signal level in channel B or FIG. 16d, and the higher the temperature, the higher the signal level in channel A or FIG. 16c. As a result, both pressure and temperature can be measured with the same sensor.

Figure 17:
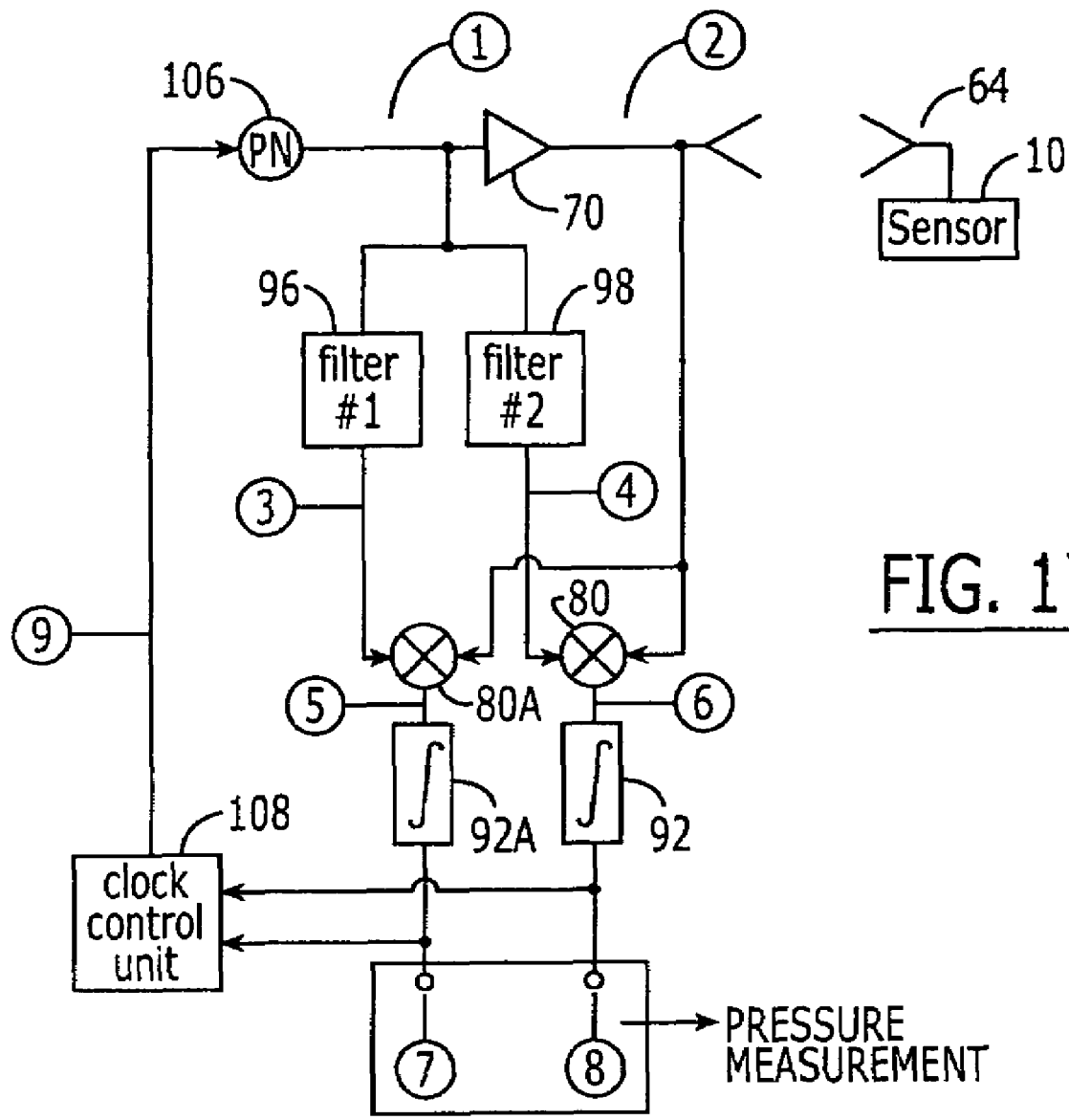
FIG. 17 is a schematic block diagram illustrating an alternate embodiment of a detection system in keeping with the teachings of the present invention using a coded signal source.

By way of further example, and with reference to FIG. 17, the difficulty in matching the delays in the interrogation and reference paths may be eased by replacing the white noise source 66, earlier described with reference to FIG. 10, with a source 106 which has a noise power spectrum similar to white noise but that is periodic in time. One class of signals that has these properties includes the Pseudo-Noise (PN) codes, as earlier described. These PN codes are well known in the field of signal processing. A PN code may include a sequence of M bits which repeat indefinitely, where $M=2^N+1$ and N is any integer. Each bit can assume a value of +1 or −1. An RF signal modulated by a PN code is an example of a "noise" source that would suffice. As a result, it is not necessary to implement a delay in the reference path to match the delay in the interrogation path. The signal in the reference path may be shifted by one or more integral code lengths. In this manner the signals applied to the two inputs of the multipliers 80, 80A can line up exactly even though their delay paths differ by a full code length. It may be noted that the signals may not automatically line up since the delays can change with position or temperature, but there is an additional control. If the bit rate is varied, the time length of the code changes. The code sequence remains the same, but the length of the code increases or decreases so that the clock rate can be adjusted. In fact, a clock rate or bit rate may define a particular "effective delay" between interrogation path and reference path signals that corresponds to a particular pressure. Thus, by varying the clock rate of a clock controller 108 operable in the circuit to maximize the total signal out of the integrators, the corresponding clock rate will be a direct measure of the temperature, and the ratio of the outputs at nodes "7" and "8" will be a direct measure of the pressure.

Consider alternate uses and operations of the system above described, wherein the system is capable of identifying and tracking individual sensors in an environment in which there are several sensors within the range of the interrogator by using a built-in code or ID in each sensor. This capability is described in connection with the sensor 10 earlier described with reference to FIG. 3a, by way of example, where the coded reflectors 52, 54 are placed at each of the two ends of the acoustic path. The sensor 10 includes the single SAW transducer 50 near the center of the sensor substrate/die 12 that launches the received noise signal and directs it bi-directionally toward the two reflectors. The surface acoustic waves are reflected back to the transducer 50 by the coded reflectors 52, 54 where the two counter propagating waves are received and transmitted back to the interrogating system 60, by way of example. In the process of being reflected the interrogating signal is convolved with the coded signal. Thus, it is given a unique signature that can be recognized at the interrogator. One operation of the sensor 10 is described in the above referenced U.S. Pat. No. 6,571,638, the disclosure of which is herein incorporated by reference. The implications that this has upon the interrogator are as follows. We know that for the time integrating correlator to function properly, the two signals applied to the inputs of the multiplier must be nearly identical (except for amplitude levels). This means that if the interrogating signal has been convolved by the coded signal (as it has by the coded reflectors in the sensor), then the reference signal must also be convolved by that same coded signal. That can be done by the SAW device or devices in the interrogator, i.e., the bandpass filters. One way to implement this is by designing a SAW device in which one transducer (input or output) is a bandpass filter and the other is coded. In this way, the reference signal is convolved with the same code or ID that is found in the sensor. Multiple sensors can operate in the same environment, but the time integrating correlator will only recognize a signal if the code in the sensor and the interrogator are the same. If coding of the sensors is not desired the reflectors in the sensors can be "wide band" reflectors, i.e., reflect everything, and then no code is used in the interrogator either.

Many modifications and other embodiments of the invention will come to the mind of one skilled in the art having the benefit of the teachings presented in the foregoing descriptions and the associated drawings. Therefore, it is understood that the invention is not to be limited to the That which is claimed is:

1. A pressure sensor comprising:
a package having a cover enclosing a cavity therein;
a piezoelectric substrate carried within the cavity, wherein a first surface of the substrate is dimensioned for carrying a SAW transducer pattern thereon and a second opposing surface of the substrate is carried in the cavity for a deforming of the substrate in response to pressure on the cover;
a SAW transducer pattern carried on the first surface of the substrate, the SAW transducer pattern including an interdigital transducer serving as both an input and an output transducer for generating and detecting a SAW, and reflectors disposed on the first surface and positioned on opposing sides of the interdigital transducer; and
at least two rows of bumps supporting the substrate within the cavity, wherein a SAW velocity change about the region of the bumps is dependent upon temperature and pressure applied to the sensor.

2. A sensor as in claim 1, wherein the piezoelectric substrate is hermetically sealed within the cavity.

3. A sensor as in claim 1, wherein the reflector is comprised of at least one of group of metallic strips, interdigital transducer and coded reflector.

4. A sensor as in claim 1, wherein the at least two rows of bumps comprises a first row of bump bonds located a distance approximately 40% from one end of the substrate and a second row of bump bonds located proximate an opposing end of the substrate such that when pressure is applied to the second side of the substrate through the cover acting as a membrane, a region around the first row of bump bonds will experience a compressional strain resulting in an increase in SAW velocity approximately linearly with the pressure, and in a second region proximate the second row of bump bonds will experience a decrease of the SAW velocity approximately linearly with pressure placed on the substrate resulting from the pressure applied to the sensor.

5. A sensor as in claim 1, wherein the interdigital transducer is coupled to an antenna.

6. A sensor as in claim 1, wherein the SAW velocity change due to the applied pressure corresponds to a shift in frequency of a sensor signal response.

7. A pressure sensor comprising:
a package having a cavity therein;
a piezoelectric substrate carried within the cavity, the piezoelectric substrate having a first surface and an opposing second surface;
a SAW transducer pattern carried on the first surface of the substrate, the SAW transducer pattern including an interdigital transducer and reflectors disposed on opposing sides thereof; and
at least two supporting posts supporting the substrate within the cavity, the at least two supporting posts extending between the first surface and a wall of the cavity, wherein a SAW velocity change about the region of the supporting posts is dependent upon temperature and pressure applied to the sensor responsive to a deforming of the substrate in response to pressure on the package.

8. A sensor as in claim 7, wherein one of the at least two supporting posts includes a gap therein sufficient for allowing SAW propagation to be transmitted therethrough.

9. A sensor as in claim 7, wherein the at least two supporting posts comprises bump bonds.

10. A sensor as in claim 7, wherein the at least two supporting posts comprise conductive material for transmitting an electrical signal therethrough.

11. A sensor as in claim 7, wherein the transducer comprises a single SAW transducer serving as both an input and an output transducer for generating and detecting a SAW.

12. A sensor as in claim 7, wherein the piezoelectric substrate is hermetically sealed within the cavity.

13. A sensor as in claim 7, wherein the piezoelectric substrate is characterized by having a temperature coefficient of delay of approximately 90 ppm per degree centigrade.

14. A sensor as in claim 7, wherein the reflectors are comprised of at least one of metallic strips, an interdigital transducer, and a coded reflector.

15. A sensor as in claim 14, wherein the reflectors are wide band reflectors.

16. A sensor as in claim 7, wherein the at least two supporting posts comprise:
a first supporting posts located between 10% and approximately 40% from one end of the substrate; and
a second row of supporting posts located between 60% and 95% an opposing end of the substrate such that when pressure is applied to the second side of the substrate, a region around the first supporting post will experience a compressional strain resulting in an increase in SAW velocity approximately linearly with the pressure, and in a second region proximate the second supporting posts will experience a decrease of the SAW velocity approximately linearly with pressure placed on the substrate resulting from the pressure applied to the package.

17. A sensor as in claim 16, wherein the first supporting posts is approximately 25% from the one end, and wherein the second supporting posts is approximately 95% from the opposing end.

18. A sensor as in claim 7, wherein the SAW velocity change due to the applied pressure corresponds to a shift in frequency of a sensor signal response.

* * * * *